(12) United States Patent
Havelock

(10) Patent No.: US 6,747,584 B2
(45) Date of Patent: Jun. 8, 2004

(54) AGGREGATE BEAMFORMER FOR USE IN A DIRECTIONAL RECEIVING ARRAY

(75) Inventor: David I Havelock, Kanata (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 10/267,729

(22) Filed: Oct. 10, 2002

(65) Prior Publication Data

US 2003/0080887 A1 May 1, 2003

Related U.S. Application Data

(60) Provisional application No. 60/327,791, filed on Oct. 10, 2001.

(51) Int. Cl.$^7$ ............................................... H03M 3/00
(52) U.S. Cl. ........................................ 341/143; 341/144
(58) Field of Search ................................ 341/143, 144, 341/118, 155; 375/30

(56) References Cited

U.S. PATENT DOCUMENTS

| | | | |
|---|---|---|---|
| 4,170,766 A | 10/1979 | Pridham et al. | 367/135 |
| 4,515,997 A | 5/1985 | Stinger | 179/111 |
| 4,982,193 A | 1/1991 | Saul | 341/159 |
| 5,138,552 A | 8/1992 | Weedon et al. | 364/413.05 |
| 5,142,286 A | * 8/1992 | Ribner et al. | 341/143 |
| 5,532,944 A | 7/1996 | Battista | 364/602 |
| 5,794,201 A | 8/1998 | Nejime et al. | 704/267 |
| 5,847,594 A | * 12/1998 | Mizuno | 327/514 |
| 6,005,506 A | 12/1999 | Bazarjani et al. | 341/143 |
| 6,011,513 A | 1/2000 | Wilson et al. | 342/372 |
| 6,208,189 B1 | 3/2001 | Freeman et al. | 327/277 |
| 6,252,531 B1 | 6/2001 | Gordon et al. | 341/143 |

OTHER PUBLICATIONS

"Signal recovery form non–uniform samples and spectral analysis on random non–uniform samples" F.A. Marvasti, IEEE Proceedings of ICA SSP 86, vol. 4, pp. 1649–1652, (Tokyo 1986).

"A novel approach to digital beamforming", Roger G. Pridham et al., J. Acoust. Soc. Am. 63(2), Feb. 1978.

"Distortion and Directivity in a Digital Transducer Array Loudspeaker", Yaxiong Huang et al., School of Engineering, University of Brighton, BN2 4GJ, UK, J. Audo Eng. Soc., vol. 49, No. 5, 2001 May, pp. 337–352.

* cited by examiner

*Primary Examiner*—Brian Young
*Assistant Examiner*—Joseph Lauture
(74) *Attorney, Agent, or Firm*—Marks & Clerk

(57) ABSTRACT

Disclosed is a method and apparatus of creating a virtual beam in a desired beam direction from an array of analog signal components. Preferably, a random number generator provides a random sequence of indices of said array and provides an associated sequence of time delays, the random sequence of indices including specific statistical properties. A multiplexer selects individual analog signal components of said array in a sequence based on the specific statistical properties. An analog to digital converter digitizes the analog signal components of said array to generate an aggregate digital signal comprising digital signal components to provide the single sequence of sampled digital signal components. An alignment unit provides a time alignment between the digital signal components, according to the random sequence of delays and indices. A down-filter filters the time aligned signal components for selecting a desired signal frequency band and eliminating noise outside the band.

65 Claims, 10 Drawing Sheets

AGGREGATE BEAMFORMER FOR USE IN A DIRECTIONAL RECEIVING ARRAY

CROSS-REFERENCE TO RELATED APPLICATION

This application claims the benefit of U.S. Provisional Application No. 60/327,791 filed Oct. 10, 2001, incorporated by reference herein

FIELD OF THE INVENTION

The present invention relates to signal processing systems. More specifically, the present invention relates to an aggregate beamformer for use in a directional receiving array such as an array of microphones.

BACKGROUND OF THE INVENTION

Beamforming is a method of combining signals that are received by an array of sensor elements by adjusting the phase relationships between signals and adding the signals, to cause enhanced sensitivity in a particular direction. Since the array of sensor elements receive the signals at different times, the signals are steered and focused in the desired direction by applying appropriate delays from each array sensor element so that the signals transmitted from a desired point add constructively. The delay for each signal is selected such that a virtual beam is focused at the desired point. In other words, beamforming electronically forms a virtual beam through steering and focusing the signals. Beamforming may serve to determine the location of the target points when it is known which beams detected that target signal. Beams represent the directional response of a system, and the direction of a beam is an angle relative to the array. The beam direction is generally focused to a point, which may or may not be at infinity.

Beamformers are utilized with arrays of electromagnetic and sonic receiving elements, for combining signals of the receiving elements to produce beams of electromagnetic and sonic energy. The term beam is used both for radiant energy received from a particular direction as well as for a beam of transmitted radiant energy since the receiving and transmitting radiation patterns of an array of receiving or radiating elements are identical. Beamformers for receiving arrays employ linear circuits for summing together the signals of the respective receiving elements and for imparting selective delays, or sometimes only phase shifts, to signals of the respective receiving elements. The selection of specific values of time delay is based on the direction of the desired beam relative to the array.

In some situations, the signals of the elements are sampled repetitively to produce sequences of signal samples from each of the elements. The sequences of samples are then transmitted to the beamformer, which forms one or more beams as is desired.

FIG. 1 illustrates a conventional beamformer. If the (sampled) signal at the m-th sensor element is denoted by $x_m(n\Delta t)$, where n is the sample number and $\Delta t$ is the time interval between samples, the conventional beamforming procedure results in the output signal $y(n\Delta t)$ according to the equation (1):

$$y(n\Delta t) = \sum_m W_m x_m(n\Delta t - d_m) \qquad (1)$$

wherein $W_m$ are weight factors that determine the shape of the directional response pattern;

$x_m(n\Delta t)$ is the output from sensor element m at time $n\Delta t$;

$\Delta t$ is the time interval between samples; and $d_m$ are delays that determine the direction in which the response is maximized.

In digital systems, the analog signals $x_m$ are sampled and digitized with the delays for each sensor element being an integer number of sample intervals taken as near as possible to the delay necessary for the steered direction ($\theta$). Once the signal are converted to digital data they are typically combined by beamforming using weighted sums of the data in tapped delay lines.

The generalized beamformer takes the weighted sum of current and past samples to form the beamformer output. It is more flexible in regard to obtaining desired beam shapes because it allows beam shape to be determined as a function of signal frequency. The counterpart of equation (1) for the generalized beamformer would be $$y(n\Delta t) = \sum_m \sum_k w_{m,k} x_m(n\Delta t - k - d_m),$$

wherein $w_{m,k}$ are weight factors that determine the shape of the directional response pattern, m is the array component index, and k is an index for the delayed samples.

The generalized formulation can be considered to be a special case of the conventional beamformer expressed by equation (1) if the delayed input signals as treated as separate (virtual) array components (channels) so that the array input channels are $x_p(n\Delta t) = x_m(n\Delta t - k)$, wherein p is an index for the sensor-delay pairs (m,k). In this case, the index p would simply replace the index m in the equation (1).

Since one physical input channel is used for several delayed input channels, more collisions and voids may occur for the generalized beamformer than would be the case where delayed channels are not considered.

A complete state-of-the-art acoustic signal processing system uses a collection of components such as analog to digital converters (ADC), application specific integrated circuits (ASICs), digital signal processors (DSPs), microcontrollers ($\mu$C), memory buffers, etc. integrated onto a set of printed circuit boards connected by one or more communications busses. In order to process the data received from the array of sensor elements, the front-end processor, and more specifically the beamformer, is used to process the data from multiple sensor elements substantially all at the same time. The beamformer includes a data acquisition system (DAS) for converting the plurality of sets of data received from the detectors into corresponding signals that can be processed by a signal processor.

Various problems exist with respect to current beamformer designs. The number of circuit components is large, and increases with the number of input signal components, causing high cost and complexity in the designs. The front-end components which provide coupling and anti-alias filtering are not easily integrated into an integrated solid state circuit (IC). A large number of arithmetic operations are required for the calculation of each beam and this number increases with the sampling rate and with the number of sensor elements. The precision to which delays can be realized is limited by the sampling rate (per channel) unless an interpolation filter is used. The circuit and computational complexity generally scales with the number of signal components (channels), making beamformer implementation very expensive or impractical for very large numbers of channels.

Some of these problems can be partially overcome, with associated loss of performance or increase in cost. For example, a multiplexer or switching circuit may be used to share one high speed ADC amongst several signal channels, thereby reducing the number of ADC required but there is generally a trade-off between ADC speed and resolution. The beamformer components subsequent to the ADC involve digital signal processing and can be integrated in an IC or implemented in a high speed digital signal processor (DSP) computer specifically designed for such applications but front-end components are not amenable to low cost integration for arrays of numerous sensor elements, particularly at lower audio frequencies. The large size of the non-integrated components necessitates moving them some distance from the sensor element array—requiring a high-bandwidth umbilical cord and driving circuitry in most cases.

The numeric computations can, to some extent, be sped up by using high performance processors that perform them in parallel using redundant computation units or pipeline aspects of the processing. For ultrasound applications, the incoming signal from each sensor element may be shifted to a lower frequency, by a heterodyning circuit, to reduce the subsequent circuit and computational requirements but the heterodyning circuits add cost and complexity, and are subject to variability. The precision to which channel delays can be applied is limited by the sampling interval unless interpolation filters are used to estimate the signal components at times between samples but interpolation is computationally expensive and may be inaccurate.

Arrays of sensors may be designed with sensor elements omitted from their otherwise regular geometry so that the complexity and cost associated with very large number of input channels are reduced. Such arrays are sometimes called sparse arrays. Their design is generally more complex and they do not perform as well as their fully populated equivalents.

As well, multichannel (coder-decoder) codec chips are just now being developed, which provide lower costs per sensor element for digital data acquisition but for very large numbers of sensors this approach also becomes expensive and requires many components.

A beamformer having high resolution, developed for medical ultrasound image scanners, which overcomes or at least reduces the effects of some of these problems, is a DAS using delta-sigma oversampled ADCs, described in U.S. Pat. No. 5,142,286 issued Aug. 25, 1992 in the names of David B. Ribner and Michael A. Wu (the Ribner et al. Patent), which is incorporated herein by reference. The Ribner et al. patent describes a high-resolution ADC using components commonly used to process audio signals for use in processing data from a medical ultrasound imager. Conversion is provided through the use of oversampled, interpolative (or delta-sigma) modulation followed by digital low-pass filtering, typically using a finite impulse response (FIR) filter, and then by decimation. "Oversampling" refers to operation of the modulator at a sampling rate many times above the signal Nyquist rate, whereas "decimation" refers to subsampling so as to reduce the sample rate to the Nyquist rate. The ratio $K_{over}$ of the oversampling rate to the signal Nyquist rate is designated the "oversampling ratio". As described in the Ribner et al. Patent, delta-sigma ADCs having single-bit quantizers in the overall feedback loops of their delta-sigma modulators can simplify or eliminate the anti-alias filters for individual acoustic sensor elements by using over-sampling delta-sigma ADCs, which themselves are simpler than conventional converters.

However, while the oversampling delta-sigma modulator and data rate decimator and digital filter as an ADC easily lend themselves to integration fabrication techniques, the required transimpedance pre-amplifier and anti-alias low-pass filter do not. Currently, such analog circuitry would be expensive to fabricate as a part of an integrated chip set including the delta-sigma modulator, probably more expensive than using discrete components based upon current integration techniques. Providing a separate transimpedance preamplifier and analog filter for each sensor element in discrete form as the front end of each sensor element of a DAS, nevertheless adds significant cost to the DAS where, for example, the number of sensor elements needed are on the order of 350 to 1000 sensor elements. Furthermore, a distinct delta-sigma ADC must be provided for each sensor element since the inherent feedback circuitry will not perform the intended function if one delta-sigma ADC is shared by multiplexing the signals from several sensors.

In addition to the foregoing, electronic noise can be a significant problem in DASs used for medical ultrasound imagers, particularly at low level detector signal levels. The design described in the Ribner et al. patent uses a delta-sigma modulator and FIR digital filter. The noise levels of the design tend to remain substantially the same throughout the dynamic range of the input signal.

Recently, there have been developments in integrated acoustic sensor elements. Arrays of acoustic sensor elements for ultrasound applications are a well-developed technology (as in medical ultrasound imaging) but arrays of audio sensor elements integrated on a chip are only now being developed. The electronics for conversion of the signals from the array of sensor elements into digital data, and the subsequent digital data processing are typically remote from the sensor element array; they are not integrated on the same chip.

Current fully digital systems provide greatly improved quality; however, the required beamforming and processing hardware is extensive, expensive, and consumes significant power. The computation necessary for beamforming is typically done by specialized high-speed digital signal processing (DSP) hardware due to the large number of arithmetic operations involved. The number of operations increases as the number of sensor elements increase.

It is desirable therefore to simplify the front end of the DAS so as to allow it to be made entirely as integrated circuitry, to reduce the number of components and the cost, to reduce the number of numeric computations required for beamforming, and to improve the beamformer time delay resolution—all regardless of the number of sensor elements used.

SUMMARY OF THE INVENTION

An aggregate beamformer for use in a directional receiving array such as an array of microphones is disclosed. The aggregate beamformer selects the numerous analog signal components received from an array of input elements in a random sequence and combines them into a single sequence of oversampled signal components (aggregated) prior to providing a time alignment between the signal components according to the desired beam direction.

According to one aspect, the invention provides a beamformer for creating a virtual beam, in a desired beam direction, from an array of input signal components (input channels) obtained from an array of input elements, each input element generating an analog signal component. The beamformer comprises a sampling unit for sequentially selecting individual input analog signal components of the array in a random sequence at an oversampling rate, and outputting an aggregated digital signal comprising a single sequence of sampled digital components. An alignment unit provides a time alignment between the digital signal components, the time alignment providing coherent reinforcement of the analog signal components arriving from the desired beam direction. A sequencing unit provides the random sequence for selecting input analog signal components and the time delays for said alignment unit. A down-filter filters the time aligned signal components.

In one aspect, the down-filter comprises a digital to analog converter (DAC) for converting the digital time aligned digital signal components prior to filtering.

In another aspect, the down-filter comprises a decimator for decimating the filtered signal.

In one aspect, the sampling unit comprises a channel selector for sequentially selecting individual input analog signal components of the array in a random sequence at an oversampling rate, and an analog to digital converter (ADC) for digitizing the oversampled analog signal components to generate an aggregate digital signal comprising digital signal components.

In another aspect, the sampling unit comprises analog to digital converters (ADCs) for digitizing the individual input analog signal components of said array, and a digital channel selector for sequentially selecting in a random sequence at an oversampling rate the digital signal components to generate an aggregate digital signal comprising digital signal components.

The sequencing unit comprises a random number generator, a parameter processing unit, and a collision management unit. The parameter processing unit determines a random sequence in which the input channels are to be selected and the associated delay between successive analog signal components for a desired beam direction. The collision management unit modifies, or causes the parameter processing unit to modify, the random sequence and associated delays according to whether a collision would occur during time alignment. A collision is deemed to occur when the sequence of digital signal components already contains a data value at the position in the sequence into which the data from the selected channel would be placed with the associated time delay. A position in said sequence that does not contain a data value is called a void.

The alignment unit may be a sequencing buffer for sequencing the digital signal components in a sequenced array based on the delay between successive analog signal components as determined by the sequencing unit.

There are many advantages in using an aggregate beamformer. The beamformer is implemented with fewer components than the conventional beamformer. This is in part because, due to the high sampling rate of the random sampling process, the need for anti-alias filters is eliminated. Where the sensor bandwidth is within the oversampling rate so that the anti-alias filters can be omitted, the entire beamformer can be integrated into an IC, which may additionally include integrated sensors.

The numeric computations are restricted to the (digital) filter and are fewer than conventional beamforming when the number of elements is large. The delay resolution is greatly improved by the oversampling factor. The circuit and computational complexity do not increase significantly with the number of sensors because components such as anti-alias filters, multiple ADCs, tapped delay lines, and summers have been eliminated. The response to signal within the beam is identical to that of conventional beamformers.

The unwanted components originating elsewhere than where the beam is focused are captured as broadband noise, which is then substantially removed by the down-filter and any residual noise will not be coherent with the desired signal.

The costs for conventional beamforming scale with the number of input elements whereas they increase only marginally for the aggregate beamformer. For example, an implementation for 500 input elements would look identical to one for 8 input elements except that the multiplexer would have more inputs.

Furthermore, for a large number of input channels the digital signal processing necessary for the aggregate beamformer requires less computation than conventional beamforming; the only computations performed in the beamformer of the present invention are the filtering done prior to decimation, the random number generation (where a look-up table is not used for this purpose), and the addition of steering delays to the sequencing address, which occur at a fixed rate independent of the number of input elements.

Embodiments of the invention simplify beamforming techniques in directional array systems and help bring this technology within range of consumer product price ranges. Embodiments of the invention may be used in systems wherein a virtual beam is used for directional pickup of sound or vibration using an array of acoustic, vibration or seismic sensors. The virtual beam may be used for the construction of imagery for medical, material diagnostic, or machine intelligence purposes using an array of acoustic, electromagnetic, or optical sensors.

The aggregate beamformer can be applied to antenna arrays for digital receiving stations such as cellular telephone base stations. Since the ratio of the output (audio) bandwidth to the signal sampling rate is very high in these applications the residual noise of the aggregate beamformer will be small.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein:

FIG. 3b is a schematic diagram of a preferred sampling unit for the beamformer of FIG. 3a;

FIG. 3c is a schematic diagram of an alternative sampling unit for the beamformer of FIG. 3a;

FIG. 3d is a schematic diagram of a preferred sequencing unit for the beamformer of FIG. 3a;

FIG. 5 illustrates buffer address generation for the beamformer of FIG. 3a;

FIG. 7b is a schematic diagram of a down-filter for the beamformer of FIG. 3a;

FIG. 7c is a schematic diagram of an alternative down-filter for the beamformer of FIG. 3a;

FIG. 8b illustrates a preferred method of beamforming performed by the beamformer of FIG. 3a;

FIG. 10 illustrates an alternative embodiment to the beamformer of FIG. 3a;

FIG. 11b illustrates the effect of noise shaping on the spectrum of the beamformer of FIG. 3a.

Figure 1:
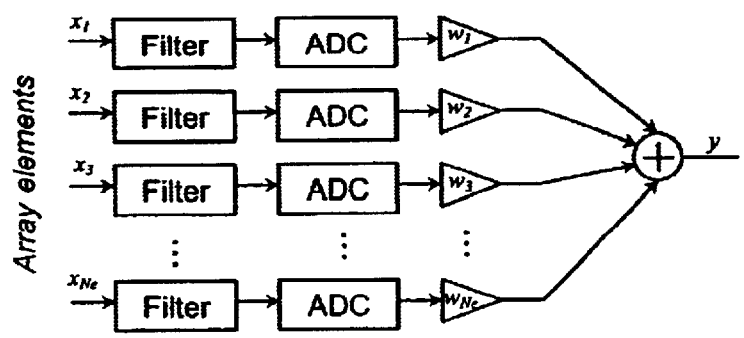
FIG. 1 is a schematic diagram of a conventional beamformer.

This invention will now be described in detail, showing how certain specific representative embodiments thereof can be made, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE PREFERRED EMBODIMENTS

The same numerals are used in the drawings to designate the same or like parts, with the like parts being identified with the same reference numerals accompanied by lower case letters.

Figure 3A:
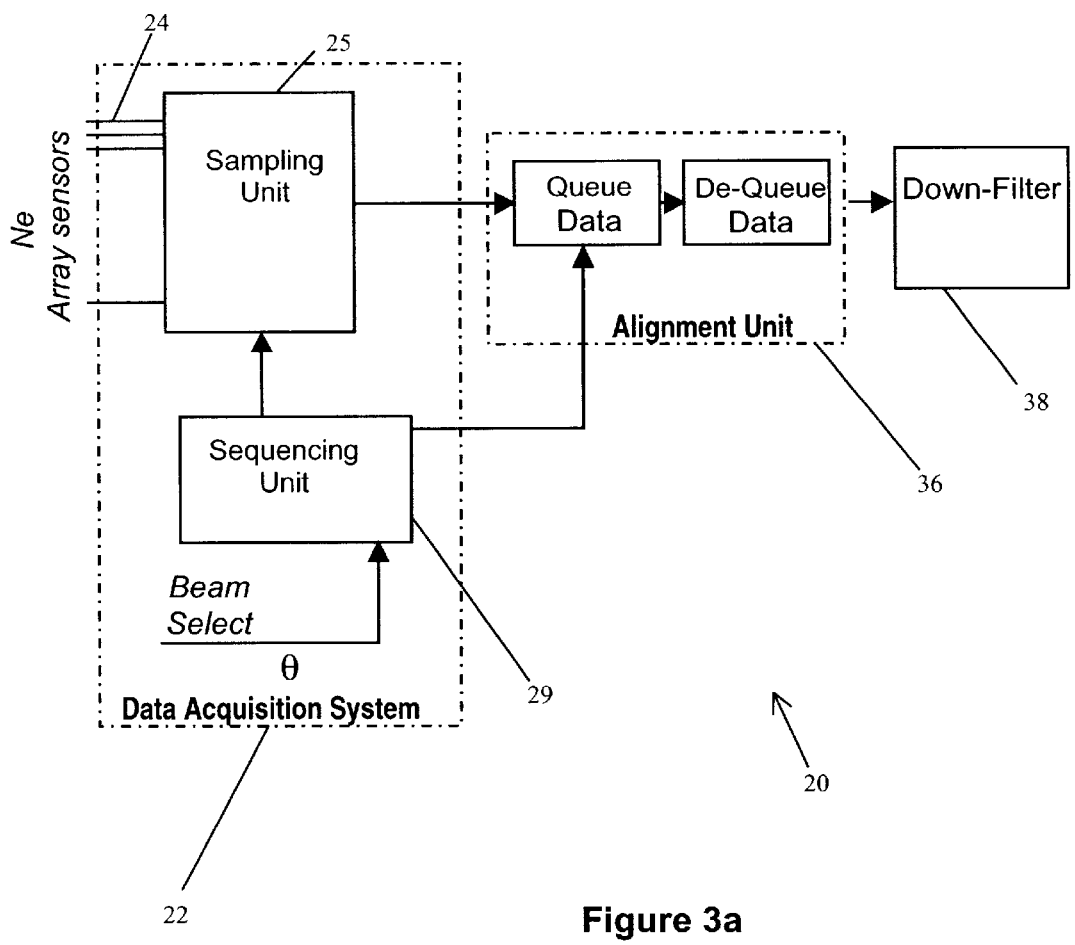
FIG. 3a is a schematic diagram of a beamformer according to one embodiment of the present invention.

FIG. 3a is a schematic block diagram representing an arrangement of a beamformer 20 according to an embodiment of the present invention. In FIG. 3a, the beamformer 20 includes the data acquisition system (DAS) 22, which receives input from an array of $N_e$ input elements, generating analog information signals. The input elements are preferably, but not limited to, acoustic sensor elements in either the audio frequency range (20 Hz–20 kHz) or the ultrasonic range (up to several MHz). The input sensors may also be vibration sensors, seismic sensors, electromagnetic sensors, or optical sensors. The number of input elements $N_e$ may be as few as two or as many as several thousand. The input elements may be discrete (separate) units, such as conventional microphones, or they may be integrated onto a chip. The output of each input element is an analog electrical signal.

The DAS 22, according to a preferred embodiment of the present invention, is arranged by a sampling unit 25 and a sequencing unit 29.

Figure 3B:
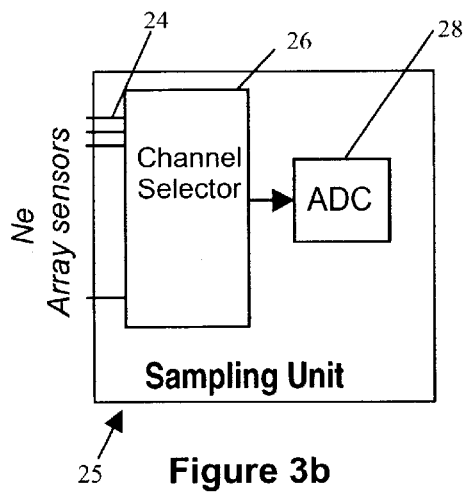

Referring to FIG. 3b, in a preferred embodiment, the sampling unit 25 is arranged by a channel selector 26 and a common ADC 28. The signals are applied to the common ADC 28 through the channel selector 26. Preferably, the channel selector 26 is a time analog signal multiplexer (MUX), but alternatively, may be a switching network. The multiplexer 26 or switching network is preferably an integrated circuit (chip). Alternatively, it can also be integrated into a single-chip design. The MUX 26 passes one of its $N_e$ input elements to its single sequence of over-sampled aggregate analog signal components. The input element selection is controlled by a digital input to the multiplexer 26, as is discussed below. This component is a combination of analog circuitry (dealing with the input elements and output signal) and digital circuitry (dealing with the selection of the input element). A high-speed multiplexer chip capable of switching input elements several millions times per second is preferably used.

The single output of the MUX 26 inputs the aggregated signal components to the ADC 28 in a random sequence so that the common ADC 28 independently converts the analog signal components. The ADC 28 converts the analog signal components at its input to a sequence of digital signal components at its output. Good quality digital audio usually requires digital values with about 16 bits (16-bit resolution), but due to the over-sampling nature of the ADC, fewer bits (as determined by the over-sampling rate) are required at the ADC output. In a preferred embodiment, a 12-bit ADC is used. The sampling rate of the ADC ($F_{ADC}$) must be at least as great as the product of the desired final sampling rate ($F_n$) and the over-sampling factor ($K_{over}$). For example, if the desired sampling rate (typical for telephone quality speech) signal is $F_n$=8 kHz and if the over-sampling rate is $K_{over}$=64, then the ADC sampling rate must be $F_{ADC}$=512 kHz. For another example, if a 100 kHz bandwidth is desired (as for an ultrasonic imaging system that may be using a 1 MHz carrier frequency) then a final sampling rate of $F_n$=200 kHz is needed and an ADC sampling rate of $F_{ADC}$=30 MHz will provide an oversampling factor up to $F_{over}$=150.

Figure 3C:
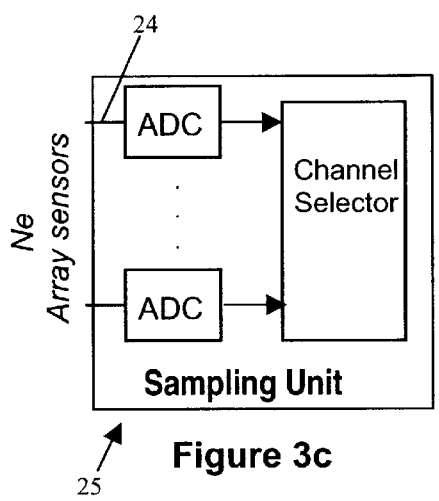

Referring to FIG. 3c, in an alternative embodiment, the sampling unit 25 may be arranged by multiple ADCs 28 and a digital channel selector 26. The ADCs 28 digitize the individual input analog signal components of said array, and the channel selector 26 sequentially selects, in a random sequence at an oversampling rate, the digital signal components to generate an aggregate digital signal comprising digital signal components.

Referring to FIG. 3a, the single digital signal output from the sampling unit 25 is applied to an alignment unit 36. The alignment unit 36 provides time alignment of the signal components. Rather than sequentially sampling data from each input element, the input elements are sampled randomly using a specific random distribution. Beamforming is effected by arranging the acquired digital data in a sequenced array according to time delays applied for each input element.

Random distribution of samples is effected by use of the sequencing unit 29. One skilled in the art will understand that the distribution may be random or pseudo-random such that unwanted signal components originating from directions other than the target beam direction are present in the time-aligned digital signal components as random noise which is then substantially removed in the filtering process.

Figure 3D:
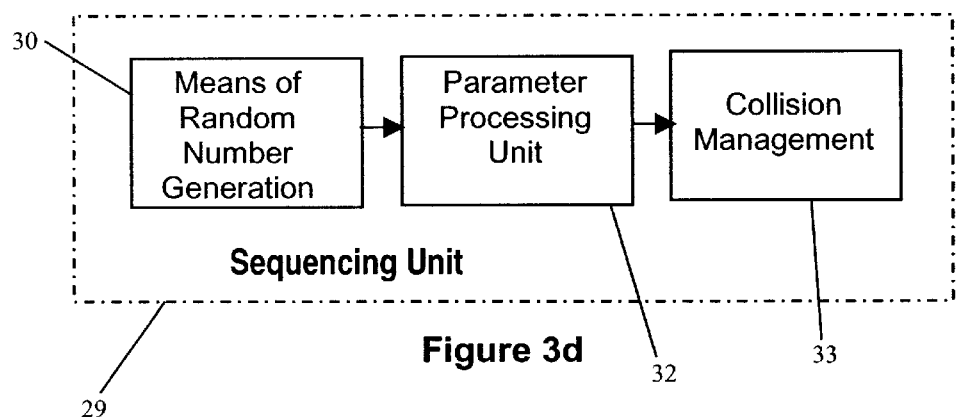

Referring to FIG. 3d, the sequencing unit 29 comprises a means of random number generation 30, a parameter processing unit 32 and a collision management unit 33.

The sequence of random numbers s(n) from the means of random number generation 30 may be generated in real time, or stored in tabular form and retrieved as needed. In either case, the sequence preferably satisfies the following conditions:

For each n, s(n) must be a member of the set $S=\{1,2, \ldots N_e\}$, (that is, $s(n) \in S$) where $N_e$ is the number of input elements.

$Pr\{s(n)=m\}=W_m$, where $Pr\{s(n)=m\}$ indicates probability, $m \in S$, and $W_m$ is the beamformer weight for the m-th input element (normalized by the sum of the weights for all input elements). The specific value of these weights can be determined using prior art methods for obtaining desired beamformer directional response patterns. It is also possible to include weight factors $W_m$ in the beam delay table so that the beam directional response can differ from one steering direction to another.

Pr{s(n)=m$_2$|s(n−k)=m$_1$}=C(k, m$_1$, m$_2$), for all n and for some values of the integers m$_1$∈S, m$_2$∈S, k>0, where Pr{.|.} indicates conditional probability, and the values of C(.,.,.) are determined so as to provide noise-shaping. Constrained conditional probabilities to achieve noise shaping can be used to reduce noise in the output signal, although the aggregate beamformer will still function without such constraints. One implementation of constrained conditional probabilities is to simply prohibit repetition of values in the random number sequence, so that C(k, m, m)=0 for k=1,2, . . . , K<<N$_e$ and for all m∈S.

The means of random number generation 30 may be a random number generator constructed by known techniques to provide a sequence of numbers which serve to select, simultaneously, the multiplexer input elements and the beamformer parameter processing unit 32. The random number generator 30 may be integrated with the other components, or optionally be replaced by tabulated values, or be provided from an external source.

The beamformer parameter processing unit 32 provides the delays. In one embodiment, the delays may be calculated. In a preferred embodiment, the parameter processing unit 32 is a read-only memory that stores sample delays. The delays d(m,k) are tabulated for each input element (index m) and for each desired beamformer steering angle (θ) (index k). Since the aggregate beamformer 20 samples the data at a high speed, the accuracy of the quantized delay is much better than for conventional beamforming systems. The aggregate beamformer steering direction is set externally by selecting a beam angle index k. The delay index m is then provided by the random number generator 30. Thus, the random number generator 30 is used to select the input element and delay time simultaneously.

The statistical distribution of the sequence is used to obtain the necessary beam directional response pattern and noise distribution in the aggregate beamformer output. The time-alignment of the over-sampled aggregate output of the sampling unit 25 maintains coherence for signals arriving from a specified direction and the randomization of the multiplexer input element selection reduces other signal components to noise.

Figure 11A:
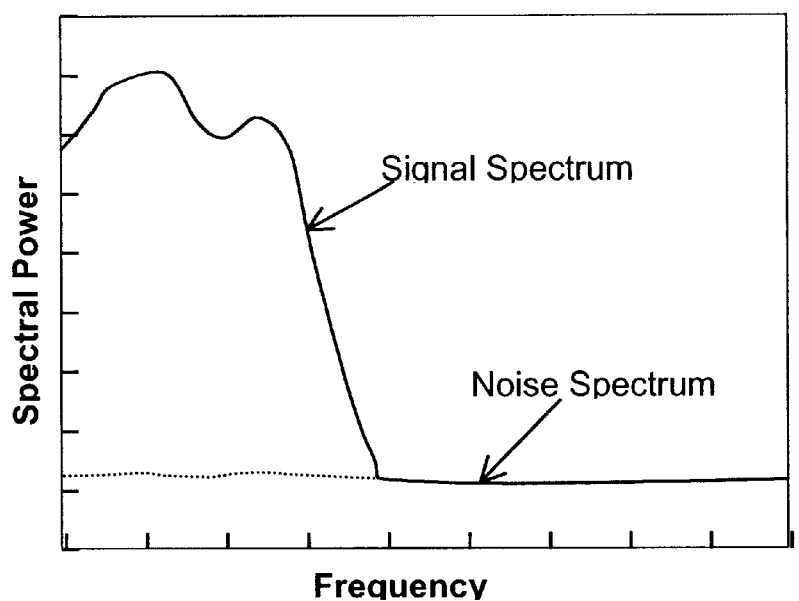
FIG. 11a illustrates the spectrum of the beamformer of FIG. 3a without noise shaping.
Figure 11B:
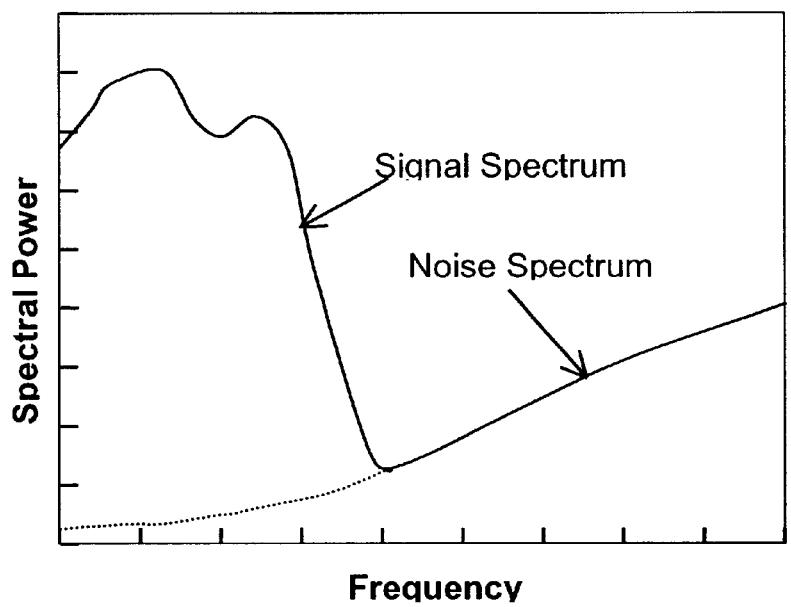

Referring to FIG. 11a, the output signal of the aggregate beamformer comprises the signal received according to the beam directional response pattern and random noise due to the random sampling process. The objective of noise shaping is to modify the distribution of noise so that the noise power within the desired signal frequency band is reduced, even though the noise power outside this band may be increased, as is illustrated in FIG. 11b. It has been determined that one method of noise shaping is to modify the conditional probabilities in the statistical distribution of the random sequence of indices so that the probability for each element of the sequence is conditional upon earlier elements of the sequence. In particular, the noise can be beneficially shaped by ensuring that index values are not repeated within some range in the sequence. For example, the repetition of an index in adjacent values of the sequence can be prohibited.

Referring again to FIG. 3d, preferably the alignment unit 36 is a sequencing buffer for sequencing the digital signal components in a sequenced array based on the delay between successive analog signal components as determined by the sequencing unit 29.

Figure 4:
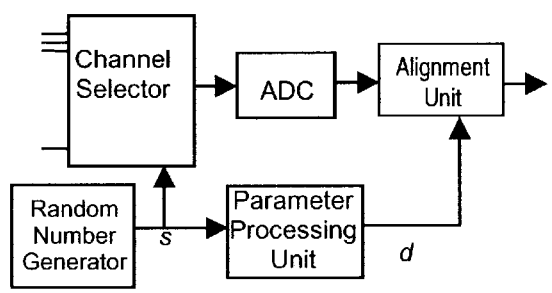
FIG. 4 illustrates a method of sampling-driven collision management according to one embodiment of the present invention.

Referring to FIG. 4, the collision management unit preferably follows a "sampling-driven" sequencing embodiment, wherein the data presents the samples to the ADC 28 from the input elements 24 in the sequence given by the random number generator 30.

The sampling-driven sequencing method is represented by the equation (2):

$$y(n-d(s(n)))=x_{s(n)}(n) \qquad (2)$$

wherein:

y(n) is the data passed from the data buffer to the down-filter;

x$_k$ is the digitized data from the input element k;

s(n) is the sequence of random numbers;

n is the clock counter for the processing; and d is the table of beam delays.

Figure 5:
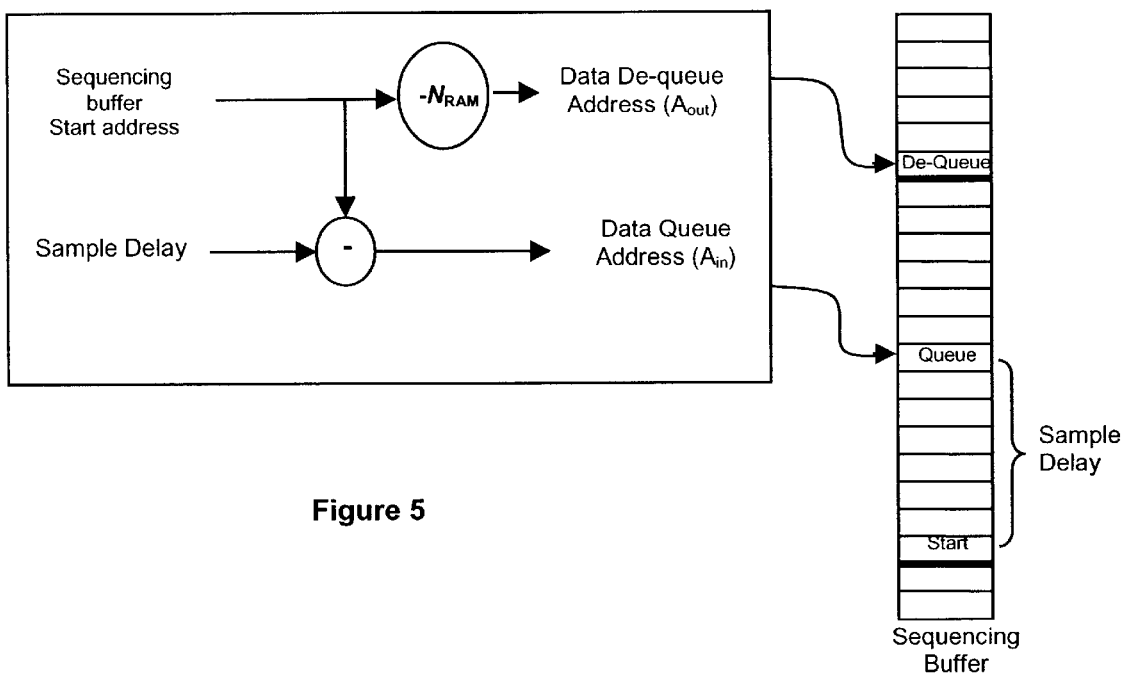

Referring to FIG. 5, the data-sequencing buffer 37 is used to properly sequence the digital data for output. The data sequencing buffer 37 includes sequencing logic to store (queue) and retrieve (de-queue) data. It is composed of memory with control logic to update the memory continually with new data from the ADC 28.

The pointers into the data-sequencing buffer where new data is written (queued) or final output data is read (de-queued) are illustrated in FIG. 5. Note that the output data is de-queued at the 'end' of the buffer 37. After each output sample is passed from the buffer to the down-filter 38, the buffer 37 start address is incremented (moved downward in the figure).

Figure 6:
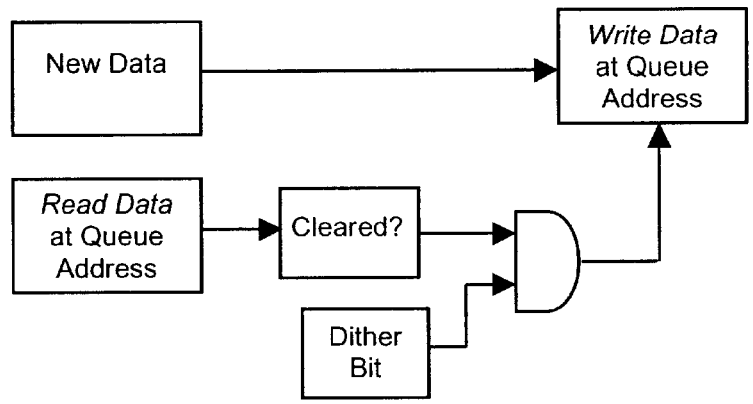
FIG. 6 illustrates a method of putting data into the queue of the sequencing buffer of FIG. 5.

Referring to FIG. 6, when a new data value is being put into the data-sequencing buffer 37, a check must first be made to ensure that the buffer location at the queue address A$_{in}$ is empty. If it is not, then a 'collision' is deemed to have occurred. In the case of a collision, a random bit is generated, having 0 or 1 with equal probability. The new data value is entered into the queue, over-writing the old data, if the value of the bit is 1, otherwise the new data is discarded. (The "D"-shaped symbols in the figure indicate a logical 'and' operation.) Alternatively, the new data value may be placed in a nearby empty memory location to avoid losing data.

Figure 7A:
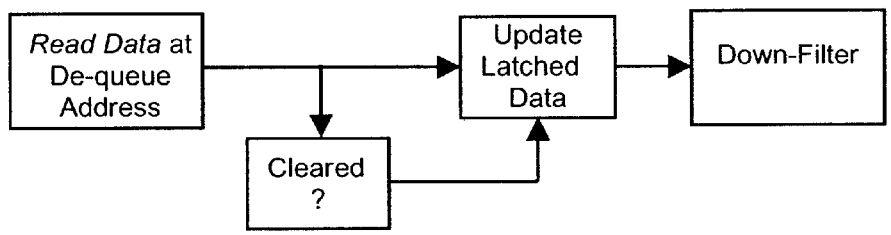
FIG. 7a illustrates a method of taking data out of the queue of the sequencing buffer of FIG. 5.

Referring to FIG. 7a, as data is de-queued from the sequencing buffer, for output to the down-filter 38 (seen schematically in FIG. 3 and discussed below), a test is performed to see if there has actually been data written into the buffer at the de-queue address. This is useful because collisions result in lost data or voids in the sequencing buffer. Where no data is available, the previous output data value is re-used. In other words, the data is replicated to fill in the voids.

Analysis indicates that collisions occur about 30% of the time. Various methods are available to reduce the effects of collisions, including pre-testing the multiplexer input element selection or inserting the new data at a cleared buffer position near the queue address. Various collision management techniques could be used to reduce the amount of data lost. Where data are lost, interpolation methods might be used rather than the simple repeat-data method illustrated in FIG. 7a.

Rather than reading the data buffer explicitly to see if a collision has occurred (thereby requiring a read-write sequence for each write), a separate, faster, 1-bit tag-memory can be used to reduce the access time on the main data buffer 36. This tag memory could also be used to find a nearby empty memory location to store new data when a collision is detected. This would be an enhancement to collision management.

Collisions have only a small effect on the final performance of the aggregate beamformer because they generate random noise that is reduced by the down-filter 38.

Figure 8A:
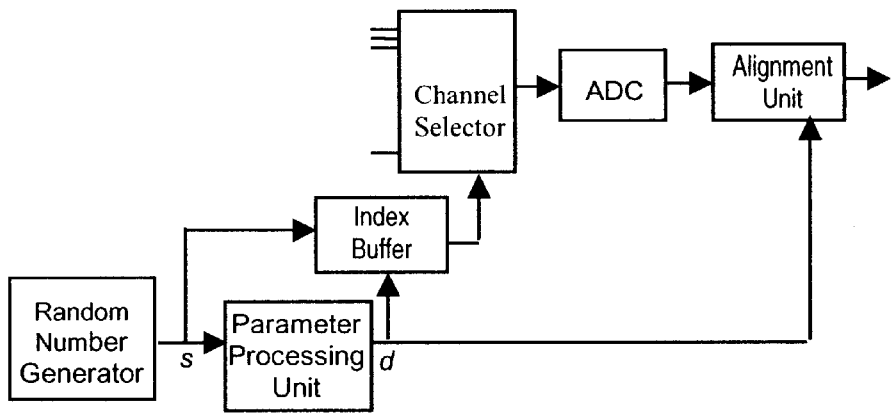
FIG. 8a illustrates a method of buffer-driven collision management according to one embodiment of the present invention.

Another embodiment for the collision management unit is to use a 'buffer-driven' sequencing method rather than the 'sampling-driven' sequencing that has been described. The sampling-driven method presents data samples to the ADC 28 from the input elements 24 in the sequence given by the random number sequence. Referring to FIG. 8*a*, the buffer-driven sequencing technique arranges data in the output buffer so that input elements are represented in the sequence given by the random number sequence. This requires that the random input element numbers themselves be stored in an index buffer, with delays applied so that sampling can take place at the correct times to obtain the desired sequence of data in the data buffer. In this buffer-driven approach, collisions occur in the index buffer. Note that buffer-driven sequencing requires an extra buffer for the input element indices and that the beam delays must be applied to sequence both the (random) indices and the sampled data. An advantage of buffer-driven sequencing is that collisions may be resolved in advance of the ADC digitizing the data.

The buffer-driven sequencing method is represented by the equation (3):

$$y(n)=x_{s(n)}(n-d(s(n))) \quad (3)$$

wherein y(n) is the data passed from the data buffer to the down-filter;

n is the clock counter for the processing;

$x_k$ is the digitized data from the input element k;

s (n) is the sequence of random numbers; and d is the table of beam delays, then for buffer-driven sequencing.

Although there is no need to sum data values, as in conventional beamforming, the data in the sequencing buffer 37 has a very high sampling rate and must be filtered by down-filter 38.

Figure 7B:
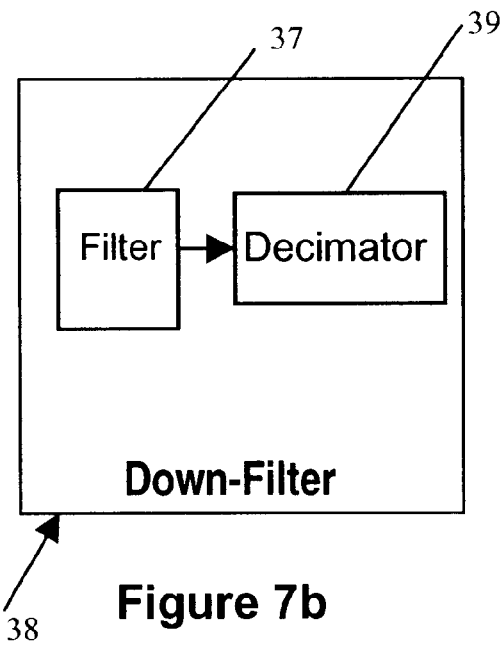

Referring to FIG. 7*b*, in a preferred embodiment, the down-filter 38 comprises a filter 37 and a decimator 39 for decimating the filtered samples to the desired (lower) sampling rate. The higher sampling rate per input element means that the delays necessary for beamforming can be obtained accurately by using (quantized) sample delay times. In a conventional beamformer (which has a lower sampling rate), it is often necessary to interpolate the received data to obtain the desired beamforming delays.

Preferably, the down-filter 38 is a low-pass filter combined with down-sampling. This process reduces the noise resulting from sound sources outside the beam response. Since the frequency band of the signal is much smaller than the total bandwidth of the pre-decimated data, filtering results in a significant improvement in signal to noise ratio. By using a large over-sampling factor, the digital low-pass filter substantially eliminates the broadband noise.

Figure 7C:
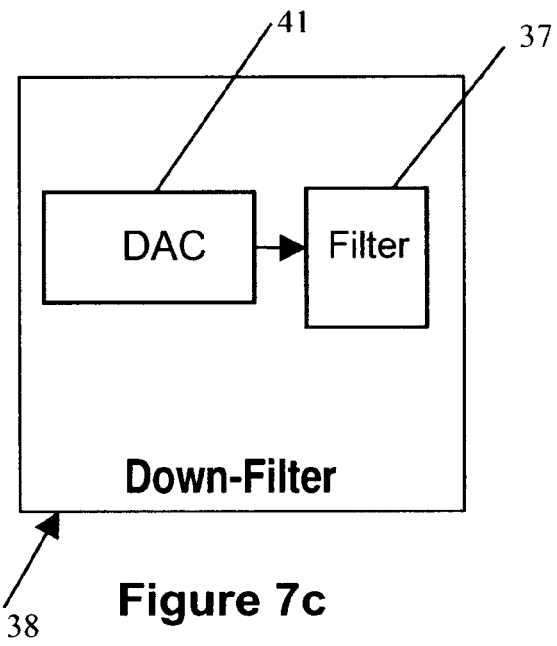

Referring to FIG. 7*c*, in another embodiment, the down-filter 38 comprises a digital to analog converter (DAC) 41 for converting the time aligned digital signal components, and a filter 37 for filtering the time aligned analog signal components.

In one embodiment, a plurality of beamformer 'beams' may be produced simultaneously by replicating the data-sequencing buffer and filters for each desired beam. A plurality of associated sequences of delays is provided where a plurality of beam directions are specified. A plurality of time alignments between the digital signal components is provided, according to the desired beam directions. Then each of the time aligned digital signals are filtered for the purpose of selecting the desired signal frequency band and eliminating noise outside this band. Collision management must be replicated for each beam.

Figure 10:
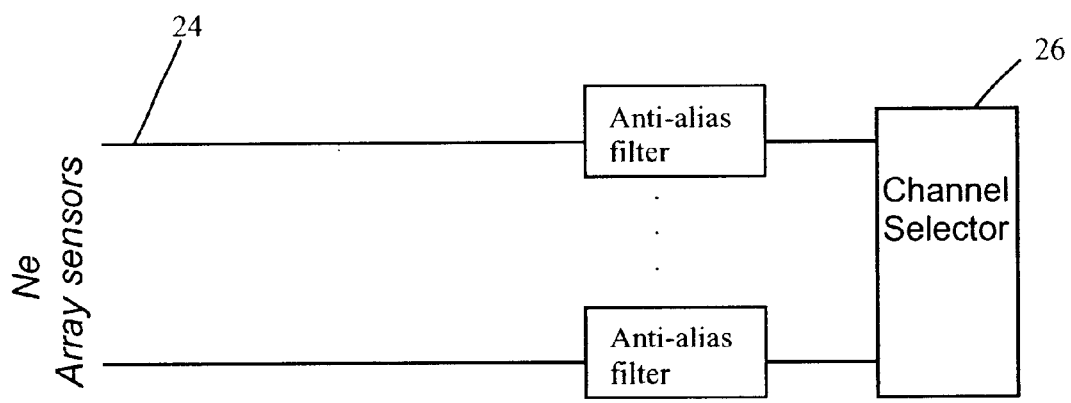

In some embodiments, it is possible that aliasing will occur if the analog signal bandwidth exceeds the sampling rate of the ADC 28. Therefore, in another embodiment, anti-alias filters can be placed on each input element, as seen in FIG. 10. Since the over-sampling factor is typically very large, the sampling rate of the ADC 28 (hence the input element sampling rate) is often greater than the signal bandwidth of the input elements—in which case the input element essentially provides the anti-alias filtering intrinsically. In any case, if anti-alias filtering is required it can be of very low order and constructed so as to be more easily integrated (into silicon) than would be the case without over-sampling.

The present invention relies upon a relationship between N, the set of indices n of the sequence of selected analog signal components and M, the set of indices m of the sequence of time aligned digital signal components. According to the 'sample-driven' sequencing method this relationship is a function $f_{sd}$: N→M with $f_{sd}(n)=n-d(s(n))$, where s is the random sequence of input channel numbers and d is the associated delay for a given beam direction. This function initially maps the domain N into the range M but the image of the function, $f_{sd}(N)$, may be a subset of M. Wherever the inverse of the function, written as $f_{sd}^{-1}(m)$, is a set with more than one member a collision is deemed to exist, in which case the function is modified by a collision management strategy for the purpose of reducing $f_{sd}^{-1}(m)$ to a single element. For example, collision management may reduce the size of the domain by removing all but one member of the set $f_{sd}^{-1}(m)$ from the domain. Additionally, collision management may first reduce the number of collisions by re-mapping them to other (nearby) elements of the range. The resultant time aligned sequence of digital signal components is $y(f_{sd}(n))=x_{s(n)}(n)$. The image $M'=f_{sd}(N)$ of the function after modification by collision management is a subset of M.

Alternatively, according to the 'buffer-driven' sequencing method, the function may map in the reverse direction so that $f_{bd}$:M→N with $f_{bd}(m)=m-d(s(m))$. In this case, collisions occur when several element of M are mapped to the same element of N. Collision management works, as for 'sample-driven' sequencing, by removing all but one member of the set $f_{bd}^{-1}(n)$ from the domain, possibly after first reducing the number of collisions by re-mapping them to other (nearby) elements of the range N. The resultant time aligned sequence of digital signal components is $(m)=x_{s(m)}(f_{bd}(m))$. The domain $M'=f_{bd}^{-1}(N)$ of the function after modification by collision management is a subset of M.

In any case, whether the 'sample-driven' sequencing method or the 'buffer-driven' sequencing method is used, some elements of M will not lie in M'. These elements are called voids because the sequencing buffer contains no digital signal component data at these locations. To complete the filter computations, voids are filled with some representative data values, for example the last current data value.

The method used for collision and void management may affect the conditional probabilities necessary for noise shaping. Treating collisions by randomized replacement preserves noise shaping by the prohibition of repetition of values, as described above. Filling voids by replication, however, does not preserve this noise shaping implementation precisely. One method of filling voids, which preserves noise shaping by the prohibition of repetition of values, is to fill voids with a nearby sample that comes from an input channel consistent with the noise shaping requirements. This method is referred to as void filling by replacement. In this method, the replacement samples are shifted from their proper time alignment but this shift will introduce only a small random noise since the over-sampling ratio used in the aggregate beamformer is high.

Figure 2:
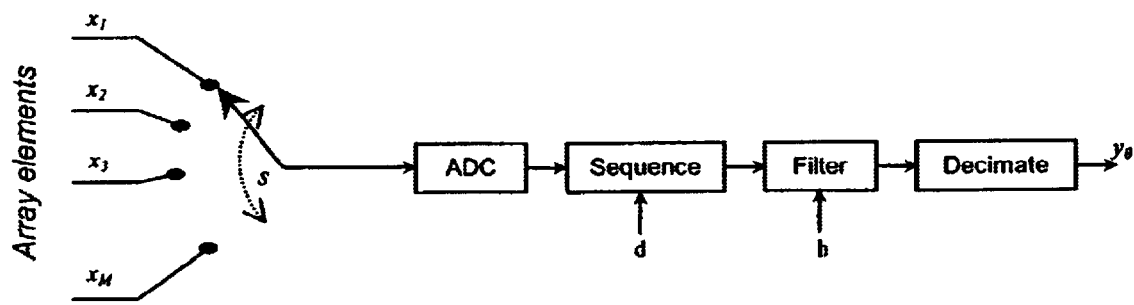
FIG. 2 is a schematic diagram of a beamformer according to one embodiment of the present invention, particularly illustrating the mathematics of the beamformer.

Referring to FIG. 2, the beamformer of the present invention combines an array of analog signal components from an array of input elements to obtain an output signal for a beam steering direction according to the equation (4):

$$y_\theta(nK_{over}\Delta t) = \sum_k h(k) x_{s(nK_{over}-k)}((nK_{over} - k)\Delta t - d(s(nK_{over} - k))) \quad (4)$$

wherein $y_\theta(nK_{over}\Delta t)$ is the beamformer output signal for beam direction $\theta$;

h represents the impulse response of a digital decimation filter;

s(n) is a random sequence of sensor element numbers adjusted for collision management;

$x_m$ is the m-th analog signal component;

n is the sample number;

k is the summation index;

$K_{over}$ is an over-sampling factor and is $\gg 1$;

$\Delta t$ is the time interval between samples at the ADC; and $d_m$ are time delays and they determine the direction in which the response is maximized, adjusted for collision management.

Figure 8B:
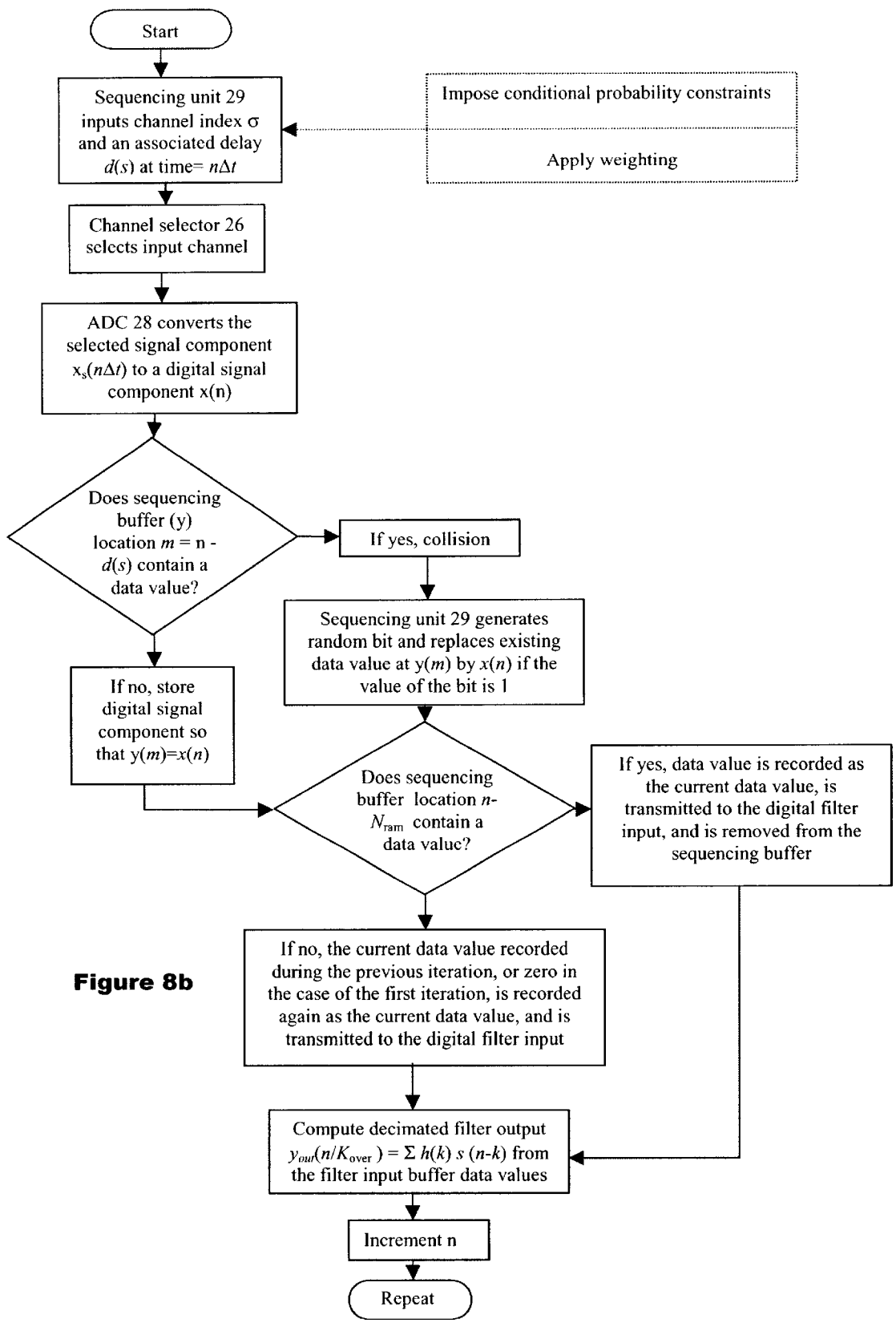

Referring to FIG. 8b, in a preferred embodiment the beamformer of the present invention, performs beamforming according to the iterated steps: at time $n\Delta t$, where n is the index for both the iteration of the steps and the sampling times and $\Delta t$ is the sampling interval, an input channel index s(n) and an associated delay d(s(n)) is provided by the sequencing unit (at this time, it is possible to optionally use the parameter processing unit to impose conditional probabilities and apply weighting); the MUX selects input channel s(n); the ADC converts the selected analog signal component $x_{s(n)}(n\Delta t)$ to a digital signal component x(n); the sequencing buffer (y) is examined to determine if the location m=n−d(s(n)) contains a data value; if y(m) does not contain a data value then the digital signal component is stored at said location so that y(m)=x(n), otherwise a collision is deemed to have occurred; if a collision occurs then a random bit is generated by the sequencing unit and the existing data value at y(m) is replaced by x(n) if the value of the bit is 1; if the sequencing buffer location n−$N_{ram}$ contains a data value then this data value is recorded as the current data value, is transmitted to the digital filter input, and is removed from the sequencing buffer, otherwise the current data value recorded during the previous iteration, or zero in the case of the first iteration, is recorded again as the current data value, and is transmitted to the digital filter input; if n/$K_{over}$ is an exact integer, where $K_{over}$ is the oversampling factor, then the decimated filter output $y_{out}$(n/$K_{over}$)=$\Sigma$h(k)y(n−k) is computed from the filter input buffer data values (with the summation being done over k); the value of n is incremented and the steps are repeated for the next iteration.

The sequencing buffer may be a circular buffer of length $N_{ram}$, hence the addresses of the sequencing buffer are computed according to Modulo-$N_{ram}$, which is a well known mathematical function. The value of $N_{ram}$ is greater than the longest associated delay d. In a like manner, the digital input filter may be a circular buffer of length $N_{filt}$, with $N_{filt}$ being greater than the length of the filter impulse response {h(k)}. Preferably, the arithmetic precision of the digital filter is determined, by known methods, so as to be sufficient to ensure that the decimated filter output has a dynamic range which is greater than that of the ADC by a factor equal to the square root of the oversampling factor $K_{over}$.

The beamformer of the present invention provides the identical output of a conventional beamformer except that additional noise is present. The noise is distributed over the entire bandwidth of the over-sampled signal y(n) and is substantially removed by the decimation filter and subsampling. (The method of noise removal is analogous to that of an over-sampling analog to digital converter). The weight factors $W_m$ of the conventional beamformer are implemented through the statistical distribution of the random sequence s(n) in that Pr{s(n)=m}=$W_m$, where Pr{s(n)=m} indicates a probability.

The additional noise power is equal to the power from 'incoherent signals', that is, signals that are not received within the beamformer directional response pattern. This noise is reduced by 3 dB for each doubling of the over-sampling factor $K_{over}$. To be negligible, the noise must be less than the noise levels that exist in the conventional beamformer due to 'sidelobe leakage' (wherein signal components from directions other than the intended beam steering direction appear at reduced levels in the output of the conventional beamformer.) A reasonable range of over-sampling values is 64–1024.

The foregoing beamformer is thus an improvement over the prior art beamformers described.

Replacing the anti-alias filters, multiple ADCs, tapped delay lines and summers of conventional beamforming with a high speed multiplexer, a random number generator, and a sequencing buffer of an embodiment of the present invention, reduces the complexity of the front end processor yielding a reduction in cost. The components can be completely integrated in IC form to the front end of a signal processing system, thereby reducing the overall costs of the signal processing system. A single ADC can be used to process a number of signals received from the input elements, without the need for anti-alias filters for each input element.

The invention allows for greater integration of components for digital beamforming systems and provides a practical implementation for beamforming with very high numbers of input elements.

Figure 9:
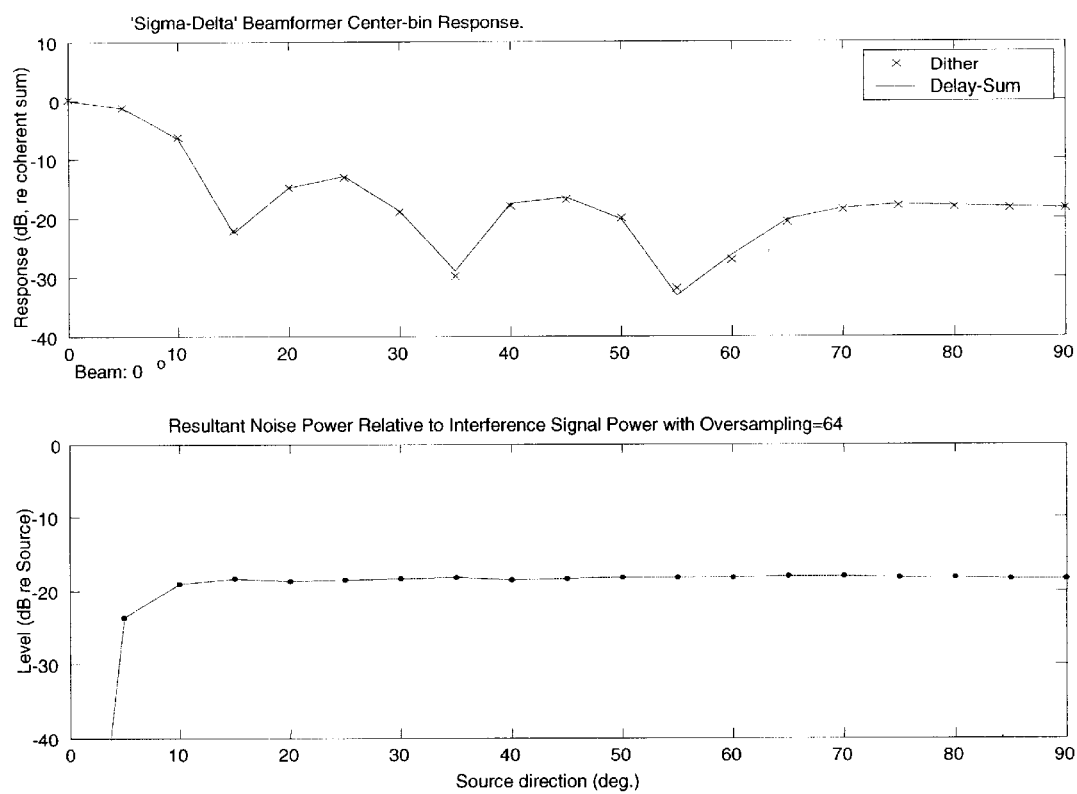
FIG. 9 is an analysis comparing the directional response of conventional beamforming and the beamformer according to the present invention.

Referring to FIG. 9, there is illustrated an analysis comparing the directional response of conventional beamforming and the aggregate beamformer. In this comparison a linear array of 8 uniformly spaced microphones provides the signal inputs for the beamformers. The beamformers are steered to a direction perpendicular to the array axis (broadside) and the aggregate beamformer uses an over-sampling factor of $K_{over}$=64. The source signal is a pure tone whose wavelength is 20/9 times the spacing between adjacent array elements. The upper frame of FIG. 9 shows the beamformer output signal power plotted as a function of the source signal direction. The response of the conventional beamformer is illustrated with a solid line and the response of the aggregate beamformer is illustrated with crosses. The responses are essentially identical.

The lower frame of FIG. 9 shows the total random noise power in the aggregate beamformer output, plotted as a function of the source signal direction. The noise power is expressed in decibels relative to the source signal power.

While the invention has been described in conjunction with conventional beamforming which treats the sound as a plane wave coming from an infinite distance away, one skilled in the art will recognize that aspects of the invention may be used in near-field beamforming which takes into account wavefront curvature and signal amplitude variations due to the finite distance between the sensors and the sound source. In this case, the variations in signal amplitude from sensor to sensor are compensated by adjusting the channel gains, as opposed to the use of array weights used to shape the beam response pattern (beam shaping).

The beamformer technology disclosed will find application in directional sound pickup for communications in hands-free telephony, video conferencing, and interactive workstations, kiosks and games. The technology may also be useful in digital ultrasound imaging and non-destructive testing. Military applications may include advanced acoustic detection, surveillance, and personal (worn) communications systems.

Numerous modifications may be made without departing from the spirit and scope of the invention as defined in the appended claims.

What is claimed is:

1. A method of creating a virtual beam in a target beam direction from analog signal components associated with an array of input elements, the method comprising the steps of:
    establishing a set of indices defining a random sequence having specific statistical properties, said random sequence determining a sequencing order for said analog signal components;
    establishing a set of associated time delay indices based on said sequencing order and said target beam direction,
    over-sampling said analog signal components to provide a set of sampled digital signal components in said sequencing order;
    establishing a time alignment between said digital signal components based on said time delay indices, said time alignment providing coherent reinforcement of the analog signal components in said target beam direction; and
    down-filtering said time aligned digital signal components to select a specific signal frequency band and eliminate noise outside said specific signal frequency band.

2. The method of claim 1, wherein the step of over-sampling said analog signal components to provide said set of digital signal components in said sequencing order comprises:
    first, digitizing individual analog signal components of said array to generate an aggregate digital signal comprising digital signal components; and
    second, selecting individual digital signal components of said array in said sequencing order.

3. The method of claim 1, wherein the step of over-sampling said analog signal components to provide said set of digital signal components in said sequencing order comprises:
    first, selecting individual analog signal components of said array in said sequencing order; and
    second, digitizing the analog signal components of said array to generate an aggregate digital signal comprising said digital signal components in said sequencing order.

4. A method of creating a virtual beam in a desired beam direction from an array of analog signal components, the method comprising the steps of:
    providing a random sequence of indices of said array and providing an associated sequence of time delays, the random sequence of indices having specific statistical properties;
    sampling the analog signal components to provide a sequence of sampled digital signal components;
    providing a time alignment between the digital signal components, according to the sequence of time delays, the time alignment providing coherent reinforcement of the signals arriving from the beam direction; and
    filtering the time aligned signal components for selecting a desired signal frequency band and eliminating noise outside the band; and
    wherein the step of sampling the analog signal components is selected from the group consisting of step a) and step b), where:
        step a) comprises:
            (i) first, digitizing individual analog signal components of said array to generate an aggregate digital signal comprising digital signal components, and
            (ii) second, selecting individual digital signal components of said array in a sequence based on the specific statistical properties to provide the sequence of sampled digital signal components; and
        step b) comprises:
            (i) first, selecting individual analog signal components of said array in a sequence based on the specific statistical properties; and
            (ii) second, digitizing the analog signal components of said array to generate an aggregate digital signal comprising digital signal components to provide the sequence of sampled digital signal components.

5. The method of claim 4, wherein the step of filtering further comprises the step of first converting the time aligned digital signal components to provide time aligned analog signal components.

6. The method of claim 4, wherein the step of filtering further comprises the step of decimating the filtered signal.

7. The method of claim 4, wherein the step of providing a random sequence of indices and associated delays further comprises the steps of:
    determining the sequence of indices; and
    determining the sequence of associated delays.

8. The method of claim 7, wherein the step of providing a random sequence of indices and associated delays further comprises the step of managing collisions.

9. The method of claim 8, wherein the step of managing collisions comprises the step of adjusting the time delay and/or the index to avoid or minimize collisions.

10. The method of claim 8, wherein the step of managing collisions comprises the steps of:
    adjusting one or several indices in the sequence of indices; and
    determining the sequence of delays based on the adjusted indices.

11. The method of claim 8, wherein the step of managing collisions comprises the step of assigning precedence to the signal component with the lesser delay.

12. The method of claim 8, wherein the step of managing collisions comprises the step of assigning precedence to the signal component with the greater delay.

13. The method of claim 8, wherein the step of managing collisions in the subsequent step of time alignment comprises the step of randomly or systematically selecting and applying any of the following steps:
    adjusting the time delay and/or the index to avoid or minimize collisions;
    adjusting one or several indices in the sequence of indices and determining the sequence of delays based on the adjusted indices;

assigning precedence to the signal component with the lesser delay; or assigning precedence to the signal component with the greater delay.

14. The method of claim 7, wherein the step of determining the sequence of indices further comprises the steps of:
providing a sequence of random numbers; and
determining the indices from the random numbers.

15. The method of claim 7, wherein the step of determining the sequence of indices further comprises the step of looking up the indices from stored tables.

16. The method of claim 7, further comprising the step of adjusting channel gains to compensate for variations in signal component amplitude variations.

17. The method of claim 7, wherein the step of determining the sequence of indices further comprises the step of performing beam shaping, wherein each array index has a specified relative frequency of occurrence proportional to the set of array component weight magnitudes $W_k$ and where the weight $W_k$ is negative for an array component, the sign of the data values from this array component is reversed.

18. The method of claim 7, wherein the step of determining the sequence of indices further comprises the step of performing noise shaping, wherein the probability of successive indices conditional upon prior indices is determined.

19. The method of claim 18, wherein the conditional probabilities are estimated by prohibiting repetition of values in the random number sequence.

20. The method of claim 7, wherein the step of determining the sequence of associated delays comprises the step of calculating said delays based on the sequence of indices and the desired beam direction.

21. The method of claim 7, wherein the step of determining the sequence of associated delays comprises the step of looking up the delays based on the sequence of indices and the desired beam direction.

22. The method of claim 4, wherein the step of selecting individual signal components is performed with use of a multiplexer.

23. The method of claim 4, wherein the step of selecting individual signal components is performed with use of a switching network.

24. The method of claim 4, wherein the step of digitizing the analog signal components of said array further comprises the step of digitizing at a sampling rate at least as great as the product of a desired final sampling rate and an over-sampling factor no less than unity.

25. The method of claim 4, wherein the step of providing a time alignment further comprises the steps of:
providing a digital sequencing array;
queuing the digital signal components in the sequencing array at a specific queuing address determined by the associated sequence of delays;
de-queuing the digital signal components in a sequential manner; and
determining the presence of digital signal components that have not been de-queued at the specified queuing address, thus causing a collision.

26. The method of claim 25, wherein the step of queuing the digital signal component in the sequencing array further comprises the step of adjusting the queuing address according to changes in the delay resulting from collision management.

27. The method of claim 25, wherein the step of dequeuing the digital signal component from the sequencing array further comprises the step of handling sequence array addresses to which no digital signal component has been queued.

28. The method of claim 27, wherein the step of handling sequence array addresses to which no digital signal component has been queued is accomplished by replication of the most recent digital signal component for providing a time aligned digital signal which is regularly sampled.

29. The method of claim 4, wherein the step of providing time alignment further comprises the steps of providing digital delay lines and arbitrarily selecting delay line outputs.

30. The method of claim 4, further comprising the steps of:
providing a plurality of associated sequences of delays where a plurality of desired beam directions are specified;
providing a plurality of time alignments between the digital signal components, according to the desired beam directions, for coherent reinforcement of the signals arriving from each of the beam directions;
filtering each of the time aligned digital signals for the purpose of selecting the desired signal frequency band and eliminating noise outside this band; and
decimating each of the filtered signals.

31. The method of claim 30, wherein the step of providing a plurality of time alignments further comprises the step of managing collisions for each of the plurality of time alignments.

32. The method of claim 4, wherein the virtual beam is used for directional pickup of sound or vibration using an array of acoustic, vibration or seismic sensors.

33. The method of claim 4, wherein the virtual beam is used for the construction of imagery for medical, material diagnostic, or machine intelligence purposes using an array of acoustic, electromagnetic, or optical sensors.

34. The method of claim 4, further comprising the step of anti-alias filtering each of the analog signal components.

35. A beamformer for creating a virtual beam in a target beam direction from an array of analog signal components associated with input elements, the beamformer comprising:
a sequencing unit for establishing a set of indices defining random sequence having specific statistical properties, said random sequence determining a sequencing order for said analog signal components, and for establishing a set of associated time delay indices based on said sequencing order and said target beam direction;
an over-sampling unit for sampling said analog signal components to provide a set of sampled digital signal components in said sequencing order;
an alignment unit for providing a time alignment between the digital signal components based on said time delay indices, said, time alignment providing coherent reinforcement of the signals arriving from said target beam direction; and
a down-filter for filtering the time aligned signal to select a specific signal frequency band and eliminate noise outside said specific frequency band.

36. The beamformer of claim 35, wherein the sampling unit further comprises:
an analog to digital converter for firstly, digitizing individual analog signal components of said array to generate an aggregate digital signal comprising digital signal components; and
a channel selector selecting individual digital signal components in said sequencing order.

37. The beamformer of claim 35, wherein the virtual beam is used for directional pickup of sound or vibration using an array of acoustic, vibration or seismic sensors.

38. The beamformer of claim 35, wherein the virtual beam is used for the construction of imagery for medical, material diagnostic, or machine intelligence purposes using an array of acoustic, electromagnetic, or optical sensors.

39. The beamformer of claim 35, further comprising an anti-alias filter for anti-alias filtering each of the analog signal components.

40. The beamformer of claim 35, wherein the sampling unit further comprises:
   a channel selector for firstly selecting individual digital signal components of said array in said sequencing order; and
   an analog to digital converter for secondly, digitizing individual analog signal components of said array to generate an aggregate digital signal comprising digital signal components in said sequencing order.

41. A beamformer for creating a virtual beam in a desired beam direction from an array of analog signal components, the beamformer comprising:
   a sequencing unit for providing a random sequence of indices of said array and providing an associated sequence of time delays, the random sequence of indices including specific statistical properties;
   a sampling unit for providing a sequence of sampled digital signal components;
   an alignment unit for providing a time alignment between the digital signal components, according to the sequence of time delays, the time alignment providing coherent reinforcement of the signals arriving from the beam direction; and
   a filter for filtering the time aligned signal for selecting a desired signal frequency band and eliminating noise outside the band;
   wherein the sampling unit is selected from the group consisting of subunit a) and subunit b), where:
      subunit a) comprises:
         (i) an analog to digital converter for firstly, digitizing individual analog signal components of said array to generate an aggregate digital signal comprising digital signal components; and
         (ii) a channel selector for secondly selecting individual digital signal components of said array in a sequence based on the specific statistical properties to provide the sequence of sampled digital signal components; and
      subunit b) comprises:
         (i) a channel selector for firstly selecting individual digital signal components of said array in a sequence based on the specific statistical properties to provide the sequence of sampled digital signal components; and
         (ii) an analog to digital converter for secondly, digitizing individual analog signal components of said array to generate an aggregate digital signal comprising digital signal components.

42. The beamformer of claim 41, wherein the filter further comprises a digital to analog converter for first converting the time aligned digital signal components to provide time aligned analog signal components.

43. The beamformer of claim 41, wherein the filter further comprises a decimator for decimating the filtered signal.

44. The beamformer of claim 41, wherein the sequencing unit for providing a random sequence of indices and associated delays further comprises:
   a parameter processing unit for determining the sequence of indices and determining the sequence of associated delays.

45. The beamformer of claim 44, wherein the sequencing unit comprises:
   a random number generator for providing a sequence of random numbers;
   a parameter processing unit for determining the indices from the random numbers; and
   a collision management unit for managing collisions during the time alignment.

46. The beamformer of claim 45, wherein the collision management unit adjusts the time delay and/or the index to avoid or minimize collisions.

47. The beamformer of claim 45, wherein the collision management unit adjusts one or several indices in the sequence of indices, and determines the sequence of delays based on the adjusted indices.

48. The beamformer of claim 45, wherein the collision management unit assigns precedence to the signal component with the lesser delay.

49. The beamformer of claim 45, wherein the collision management unit assigns precedence to the signal component with the greater delay.

50. The beamformer of claim 45, wherein the collision management unit performs the step of randomly or systematically selecting and applying the following steps:
   adjusting the time delay and/or the index to avoid or minimize collisions;
   adjusting one or several indices in the sequence of indices and determining the sequence of delays based on the adjusted indices;
   assigning precedence to the signal component with the lesser delay; or
   assigning precedence to the signal component with the greater delay.

51. The beamformer of claim 44, wherein the sequencing unit for determining the sequence of indices further comprises a look up table for looking up the indices from stored tables.

52. The beamformer of claim 44, wherein the parameter processing unit performs noise shaping, wherein the probability of successive indices conditional upon prior indices is determined.

53. The beamformer of claim 52, wherein the parameter processing unit performs noise shaping by estimating conditional probabilities by prohibiting repetition of the random number sequence.

54. The beamformer of claim 41, wherein the parameter processing unit calculates said delays based on the sequence of indices and the desired beam direction.

55. The beamformer of claim 44, wherein the parameter processing unit looks up the delays based on the sequence of indices and the desired beam direction.

56. The beamformer of claim 41, wherein the channel selector is a multiplexer.

57. The beamformer of claim 41, wherein the channel selector is a switching network.

58. The beamformer of claim 41, wherein the analog/digital converter digitizes the analog signal components at a sampling rate at least as great as the product of a desired final sampling rate and an over-sampling factor greater than unity.

59. The beamformer of claim 41, wherein the alignment unit comprises:
   a digital sequencing array;
   a queuing unit for queuing the digital signal components in the sequencing array at a specific queuing address determined by the associated sequence of delays;
   a de-queuing unit for de-queuing the digital signal components in a sequential manner; and a buffer for determining the presence of digital signal components that have not been de-queued at the specified queuing address, thus causing a collision.

60. The beamformer of claim 59, wherein the queuing unit adjusts the queuing address according to changes in the delay resulting from collision management.

61. The beamformer of claim 59, wherein the dequeuing unit hands sequence array addresses to which no digital signal component has been queued.

62. The beamformer of claim 61, wherein the dequeuing unit hands sequence array addresses to which no digital signal component has been queued by replication of the most recent digital signal component for providing a time aligned digital signal which is regularly sampled.

63. The beamformer of claim 62, wherein the sequencing unit provides a plurality of time alignments and further comprises a collision management for each of the plurality of time alignments.

64. The beamformer of claim 41, wherein:
the sequencing unit provides a plurality of associated sequences of delays where a plurality of beam directions are specified;
the alignment unit provides a plurality of time alignments between the digital signal components, according to the desired beam directions, for coherent reinforcement of the signals arriving from each of the beam directions;
the filter filters each of the time aligned digital signals for the purpose of selecting the desired signal frequency band and eliminating noise outside this band; and
a decimator decimates each of the filtered signals.

65. A beamformer which combines an array of analog signal components from an array of input elements to obtain an output signal for a beam steering direction according to the equation:

$$y_\theta(nK_{over}\Delta t) = \sum_k h(k) x_{\sigma(nK_{over}-k)}((nK_{over} - k)\Delta t - d_n)$$

wherein $y_\theta(nK_{over}\Delta t)$ is the beamformer output signal for beam direction $\theta$;

h represents the impulse response of a digital decimation filter;

s(n) is a random sequence of input element numbers adjusted for collision management;

$x_m$ is the m-th analog signal component;

n is a sample number;

k is a summation index;

$K_{over}$ is an over-sampling factor and is >>1;

$\Delta t$ is the time interval between samples at an analog to digital converter; and $d_m$ are time delays that determine the direction in which the response is maximized, adjusted for collision management.

* * * * *